(12) United States Patent
Bronstein et al.

(10) Patent No.: US 10,580,325 B2
(45) Date of Patent: Mar. 3, 2020

(54) SYSTEM AND METHOD FOR PERFORMING A COMPUTERIZED SIMULATION OF A MEDICAL PROCEDURE

(75) Inventors: Ran Bronstein, Modiin (IL); Niv Fisher, Tel Aviv (IL); Ofek Shilon, Kfar Sava (IL)

(73) Assignee: SIMBIONIX LTD., Airport City (IL)

( * ) Notice: Subject to any disclaimer, the term of this patent is extended or adjusted under 35 U.S.C. 154(b) by 1781 days.

(21) Appl. No.: 12/730,535

(22) Filed: Mar. 24, 2010

(65) Prior Publication Data

US 2011/0236868 A1 Sep. 29, 2011

(51) Int. Cl.
*G09B 23/00* (2006.01)
*G09B 23/30* (2006.01)
*G06T 19/00* (2011.01)

(52) U.S. Cl.
CPC .......... *G09B 23/30* (2013.01); *G06T 19/006* (2013.01); *G06T 2219/008* (2013.01); *G06T 2219/028* (2013.01)

(58) Field of Classification Search
CPC .................................................. G09B 23/28
USPC .......................................................... 434/267
See application file for complete search history.

(56) References Cited

U.S. PATENT DOCUMENTS

| 5,371,778 A | 12/1994 | Yanof et al. |
| 6,283,918 B1 | 9/2001 | Kanda et al. |
| 7,681,579 B2 | 3/2010 | Schwartz |
| 2002/0191822 A1* | 12/2002 | Pieper .......................... 382/128 |
| 2003/0032876 A1 | 2/2003 | Chen et al. |
| 2007/0043285 A1 | 2/2007 | Schwartz |
| 2007/0148625 A1 | 6/2007 | Blitz et al. |
| 2008/0020362 A1* | 1/2008 | Cotin et al. ................... 434/267 |
| 2008/0187896 A1* | 8/2008 | Savitsky ....................... 434/272 |
| 2009/0018808 A1 | 1/2009 | Bronstein et al. |
| 2009/0177452 A1* | 7/2009 | Ullrich et al. .................. 703/11 |
| 2009/0177454 A1 | 7/2009 | Bronstein et al. |
| 2009/0310847 A1 | 12/2009 | Matsuzaki et al. |
| 2011/0092804 A1 | 4/2011 | Schoenefeld et al. |

FOREIGN PATENT DOCUMENTS

| CN | 1874717 | 12/2006 |
| JP | H11-164833 | 6/1999 |
| JP | 2005-137455 | 6/2005 |
| JP | 2009022733 | 2/2009 |
| JP | 2009207677 | 9/2009 |
| WO | WO2009119691 | 10/2009 |

* cited by examiner

*Primary Examiner* — Michael C Grant
(74) *Attorney, Agent, or Firm* — Pearl Cohen Zedek Latzer Baratz LLP

(57) ABSTRACT

Embodiments of the invention are directed to a method of performing computerized simulations of image-guided procedures. The method may comprise receiving medical image data of a specific patient. A patient-specific digital image-based model of an anatomical structure of the specific patient may be generated based on the medical image data. A computerized simulation of an image-guided procedure may be performed using the digital image-based model. Medical image data, the image-based model and a simulated medical tool model may be simultaneously displayed.

37 Claims, 8 Drawing Sheets

SYSTEM AND METHOD FOR PERFORMING A COMPUTERIZED SIMULATION OF A MEDICAL PROCEDURE

BACKGROUND OF THE INVENTION

Many invasive medical procedures such as for example endovascular procedures can pose challenges even to the most experienced interventionists. Tortuous anatomy, difficult visualization, complex lesion morphology, and other complications can add to increased procedure time, fluoroscopy exposure, and contrast dye use. Precious time can be lost if the access strategy or equipment choice is suboptimal. Accordingly, simulation systems for image-guided procedures for training a physician without unnecessary risk, which may serve as pre-operative planning tool or post-operative assessment tool, have been introduced.

Most medical simulations may enable a doctor to practice on a virtual model that is based on predefined models of anatomical structures. These structures are not associated with a specific patient. Accordingly, such systems cannot be used for accurately planning an operation on a particular patient prior to performing the operation or for post assessment of the operation.

A more progressive simulation system is a patient-specific simulation system that uses patient-specific medical image data. A patient-specific simulated interventional environment may allow rehearsing a complete complex procedure such as endovascular procedure on a virtual model of a patient's exact anatomy, increasing the likelihood for an effective outcome in real life.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
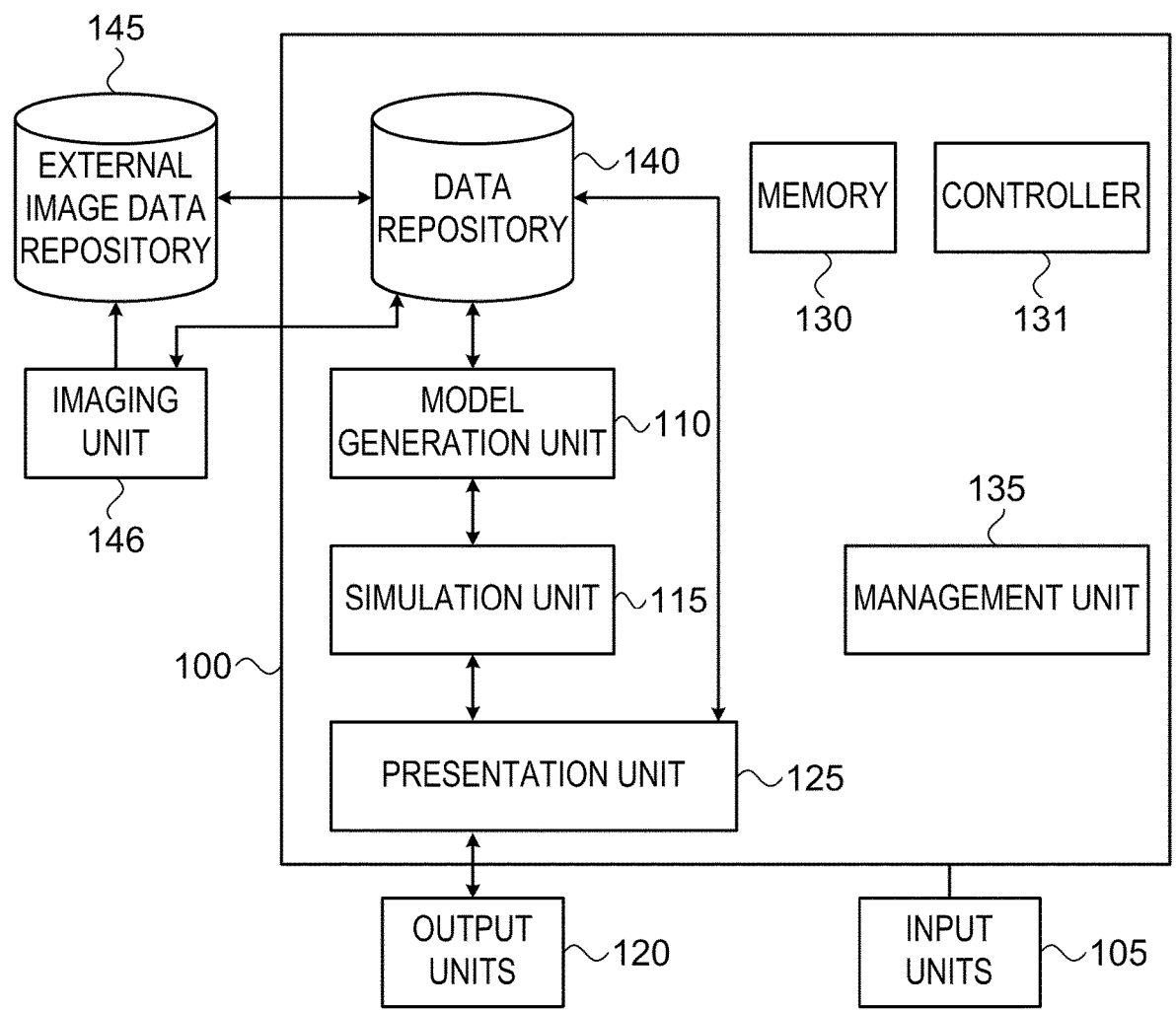
FIG. 1 shows an exemplary system for simulating an image-guided procedure according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those having ordinary skill in the art that the invention may be practiced without these specific details. In other instances, well-known methods, procedures, components, modules, units and/or circuits have not been described in detail so as not to obscure the invention.

Embodiments of the invention are directed to patient-specific computerized simulations for image-guided procedures. In some embodiments, a method for enabling a performance of a simulated procedure may include producing a digital image-based model of an anatomical structure based on medical image data received from a scan of a subject. The subject may be, for example a patient that is about to undergo an image-guided procedure. According to embodiments of the invention, the medical images or other data may be patient-specific medical images and parameters obtained from one or more imaging systems such as computed tomography (CT), a CT-fluoroscopy, fluoroscopy, magnetic resonance imaging (MRI), Ultrasound, positron emission tomography (PET) and X-Ray systems or any other suitable imaging systems. Embodiments of the invention may use as input medical image data described herein to produce a 2D, 3D or 4D model of an anatomical structure, organ, system or region. Although a simulated anatomical organ or system may be intuitive and may accurately depict anatomical aspects, it may also provide a different view with respect to traditional images or presentations the medical personnel is familiar with and/or accustomed to. For example, a physician may typically be used to examining X-Ray or CT images and may be well trained to identify anatomical structures or organs in such images but may find it difficult to identify or determine locations or orientations of organs or tools with respect to a simulated model.

According to embodiments of the invention, a method of performing a computerized simulation of an image-guided procedure may comprise receiving medical image data that may be related to a specific patient, generating a digital, image-based, model of an anatomical structure based on the received medical image data, conducting the actual simulated image-guided procedure and simultaneously displaying the digital model and the medical image data. For example, a first region in a display screen may be dedicated to displaying a simulated model of an anatomical organ while a second region on the same or other display may display a corresponding CT image of the simulated organ. In some embodiments, the medical image data, e.g., a CT slice image may be displayed in overlay mode on the simulated model. For example, a CT slice image may be displayed in the same display region the simulated model is displayed and may further be positioned according to various orientations or view selections.

As described herein, embodiments of the invention may provide a user with various views of images and other medical data. For example, views provided may be related to a predefined surface or plane. In some embodiments, an image related to a specific surface may be generated based on received raw medical image data, artificially generated medical image data or a combination of raw and artificial medical image data. For example, CT slices or other images may be processed to produce views that may not necessarily be related to the view of the imaging system used for acquiring the CT data. In some embodiments, views generated may be related to specific planes, surfaces, angles or other aspects as needed. Some exemplary planes or surfaces for which views may be generated may be an axial plane, a coronal plane, a sagittal plane, a plane orthogonal to a selected vessel, a non-planar surface, a plane related to an imaging system used to acquire said medical image data, or a plane related to a virtual imaging system, which forms part of the simulated procedure. It will be noted that while some exemplary plane or surface views are described herein, any such views may be generated as described herein. It will further be noted that the terms "surface" and "plane" may refer to substantially the same entity or aspect of a view when in applicable context, and may accordingly be used interchangeably herein. For example, a sagittal plane view and sagittal surface view may refer to the same view.

In some embodiments, an image related to a specific surface, point of view or imaging system may be generated based on received raw medical image data. For example, CT slices or data may be processed to produce views that may not necessarily be related to the view of the CT system. For example, a two dimensional X-Ray view may be produced based on a digital image-based model. In a particular scenario, a 3D digital image-based model may be generated based on input from a CT system as described herein. An X-Ray view may then be generated based on the digital image-based model. For example, a two dimensional (2D) X-Ray view may be produced by projecting a three dimensional digital image-based model on a two dimensional surface or plane. Embodiments of the invention may enable a user to select an X-Ray camera view, position or location with respect to a patient and produce an X-Ray image or view that would have been provided by an X-Ray camera located at the selected location and/or position. Accordingly, artificial or synthesized X-Ray images or views may be generated and provided even when no actual X-Ray camera is utilized for obtaining such images. In another embodiment, data received from a CT system may be used to generate a digital image-based 3D model and such model may further be used to generate a view that would have been provided by a camera fitted on a colonoscope used for examination of the colon. Accordingly, views revealing internal aspects or views of the colon may be generated and displayed. Likewise, views or images related to any applicable technology or system may be produced based on a digital image-based model. The ability to generate views or images normally produced by various systems may be highly appreciated by those of ordinary skill in the art. Advantages of such ability may include a substantial saving of cost and time since based on data received from a first imaging system, embodiments of the invention may provide output related to a second, different system. Another advantage may be the ability to synthesize and provide images related to any angle, orientation, position or location of a simulated imaging device. Artificial views related to virtual systems as described herein may be displayed, e.g., in addition to, or instead of, the image-based model described here.

As described herein, displaying of medical image data such as CT, MRI or X-Ray images may be integrated or coordinated with, or otherwise related to a presentation, a progress or other aspects of a simulated procedure. In some embodiments, presentation of medical image data may be according to a selection of a user. For example, a user may click a location on a simulated model, or otherwise select or indicate an interest in a location, anatomical organ or region related to the simulated model and be provided with a CT or other medical image corresponding to the selection. In other embodiments, presentation of medical image data may be automatically synchronized or otherwise coordinated with a progress, state, mode or context of a simulated procedure. For example, CT images related to a location of a catheter, a wire, a stent or another simulated tool that may be shown in a simulated procedure may be automatically displayed such that a CT image related to an area, a region or a volume (of a real patient, as imaged by a CT imaging system) where the stent is located (in the simulated model) may be shown. As the tool is moved from a first location to a second location, a first CT image (related to the first location) may be automatically replaced by a second CT image (related to the second location) such that a CT image of the second location is presented instead of a CT image of the first location. Accordingly, a presentation of medical image data may be automatically synchronized, matched and/or coordinated with a simulated procedure. In addition, scale or other operations as known in the art may be performed on either a region displaying the medical image data and the simulated model. For example, a user may zoom in on a region within the medical image data while leaving the display of the simulated model unchanged or alter the scale or size of the region displaying the simulated model while leaving the scale of the region displaying the medical image data. In embodiments where two separate windows or display regions are used to present the medical image data and the simulated model, any manipulations of such windows or regions as known in the art may be enabled.

Reference is made to FIG. 1 showing an exemplary system 100 for simulating an image-guided procedure according to embodiments of the invention. As shown, system 100 may comprise a computing device comprising a number of units and operatively connected to input and/or output (I/O) units. System 100 may include input units 105, output units 120, a model generation unit 110, a simulation unit 115, a management unit 135, a data repository 140, a presentation unit 125, a memory 130 and a controller 131. Input units 105 may include a mouse, a keyboard, a touch screen or pad or any suitable input devices. Input units 105 may comprise means for operating simulation tools. For example, physical objects such as handles, activation buttons and the like, as well as real medical tools may be connected to input units 105 to enable a user to operate simulated tools such as a simulated catheter. Additionally, input units 105 may include a wired or wireless network interface card (NIC) that may receive data, for example, from an imaging system. According to some embodiments, a mediator unit, e.g., a communication management unit may utilize a NIC to communicate with a system or server storing medical images such as a picture archiving communication system (PACS), may obtain any relevant imaging information, data or parameters from such a system, server or application and may store obtained data, information or parameters in local data repository 140. Output units 120 may include display screens, components for interfacing with a display screen to enable visual output or optionally a speaker or another audio device to enable audible output. Output units 120 may include one or more displays, speakers and/or any other suitable output devices. Output units 120 may additionally include force feedback components that may apply, cause or generate physical forces or resistance (e.g., friction like resistance) to physical input devices that may be operated or manipulated by a user. Output units 120 and input units 105 may communicate with any other component or units of system 100 and accordingly may enable such units to communicate with external systems. Units 105, 110, 115, 125 and 135 may be or may comprise software, hardware, firmware or any suitable combination thereof.

Also shown in FIG. 1 are an external image data repository 145 and an imaging unit 146. External image repository 145 may be any suitable or applicable database, repository or archive. For example, external image data repository 145 may be a picture archiving and communication systems (PACS) archive or repository. As known in the art, a PACS system may comprise computing and/or other devices that may be dedicated to the storage, retrieval, distribution and presentation of medical images. Images in a PACS system may be stored according to various formats, e.g., digital imaging and communications (DICOM). A PACS system typically comprises or is operatively connected to an archiving system for archiving data such as CT, MRI or other images and related data, a secured network for the transmission of patient sensitive or private information and possibly, computing devices to receive image or other data from the archiving system. Embodiments of the invention may be configured to interact with a PACS system, e.g., over a network interface card (NIC) connected to a network such that communication with a PACS system is enabled. Management unit 135 may interact, e.g., over a network and possibly according to and/or by implementing a predefined protocol, with external data repository 145 that may be a PACS system. CT, MRI or other images and related data may be thus retrieved, received or otherwise obtained from such PACS or other system and may further be used as described herein and/or stored or buffered, for example, in data repository 140. Imaging unit 146 may be an imaging system such as computed tomography (CT), a CT-fluoroscopy, fluoroscopy, magnetic resonance imaging (MRI), Ultrasound, positron emission tomography (PET) and X-Ray systems or any other suitable imaging system. As shown, medical image data and/or related data may be received by external image data repository 145 from imaging unit 146. External repository 145 may receive medical imaging data from any other applicable source, e.g., over a network from a remote site or hospital or by means of a removable storage device that may be connected to repository 145. As shown, system 100 may receive image data and/or related data directly from imaging unit 146. Although not shown, system 100 may receive imaging and/or other data from any applicable source, accordingly, embodiments of the invention are not limited by the type, nature or other aspects of a source of medical imaging or other data nor by the way such data is communicated and/or received.

Model generation unit 110 may include components or modules for generating a digital model and its graphical representation, e.g., a 3D anatomical model of an anatomical structure, such as an organ vessel system or any other area of interest within a body of a subject. The model may be generated by model generation unit 110 according to information received from an imaging system, for example, a medical image received from a CT system via input unit 105. It will be recognized that embodiments of the invention are not limited by the method or system for generating a digital image-based model of an anatomical structure, any methods or systems may be used for generating such model without departing from the scope of the invention. Simulation unit 115 may include components for generating a simulation of an image-guided procedure. For example, when a user performs a simulation, for example as a pre-procedure for an image-guided procedure, using simulation unit 115, a graphical representation of a digital model (e.g., produced by model generation unit 110), and the simulation process may be displayed on a monitor that may be one of output units 120. A generation of a digital model of an anatomical organ, system, section or region (e.g., by model generation unit 110) and a simulation of a procedure (e.g., by simulation unit 115) may be according to methods, systems and/or other aspects as described in US Patent Application Publication US 2009/0177454. Controller 131 may be any suitable controller or processing unit, e.g., a central processing unit processor (CPU). Memory 130 may be any suitable memory component, device, chip or system and may store applications or other executable codes that may be executed by controller 131 and/or data, e.g., data that may be used by applications or programs executed by controller 131. For example, executable code, applications or modules implementing model generation unit 110 and/or simulation unit 115 may be loaded into memory 130 and executed by controller 131.

It will be recognized that system 100 as described herein is an exemplary system. According to embodiments of the invention, system 100 may be implemented on a single computational device or alternatively, in a distributed configuration, on two or more different computational devices. For example, model generation unit 110 may operate on a first computational device and managed by a first management unit whereas simulation unit 115 may operate on another computational device and managed by a second management unit that communicates with the first management unit. In another exemplary embodiment, management unit 135 may operate on a computational device, model generation unit 110 may operate on a second computational device and simulation unit 115 may operate on a third computational device.

Presentation unit 125 may control, coordinate or manage a display or presentation of video, audio or other aspects of a simulated procedure and related medical image data. For example, presentation unit 125 may receive data, parameters or other information from a plurality of sources and incorporate received or obtained data into a presentation to a user. Presentation unit 125 may coordinate, synchronize or otherwise relate a presentation of information from a plurality of sources within a single presentation. For example, presentation unit 125 may coordinate or synchronize a presentation of medical image data, e.g., CT images with a presentation and/or performance of an image guided simulated procedure. Alternatively or additionally, presentation unit may cause a presentation of information according to a user selection. For example and as further described herein, a view selection from a user may be received and a presentation of medical image data may be according to such selection. Management unit 135 may interact with any module, unit, application or other applicable entity and may perform coordination, scheduling, arbitration, supervising and/or management of flows, procedures or other aspects as described herein.

Figure 2:
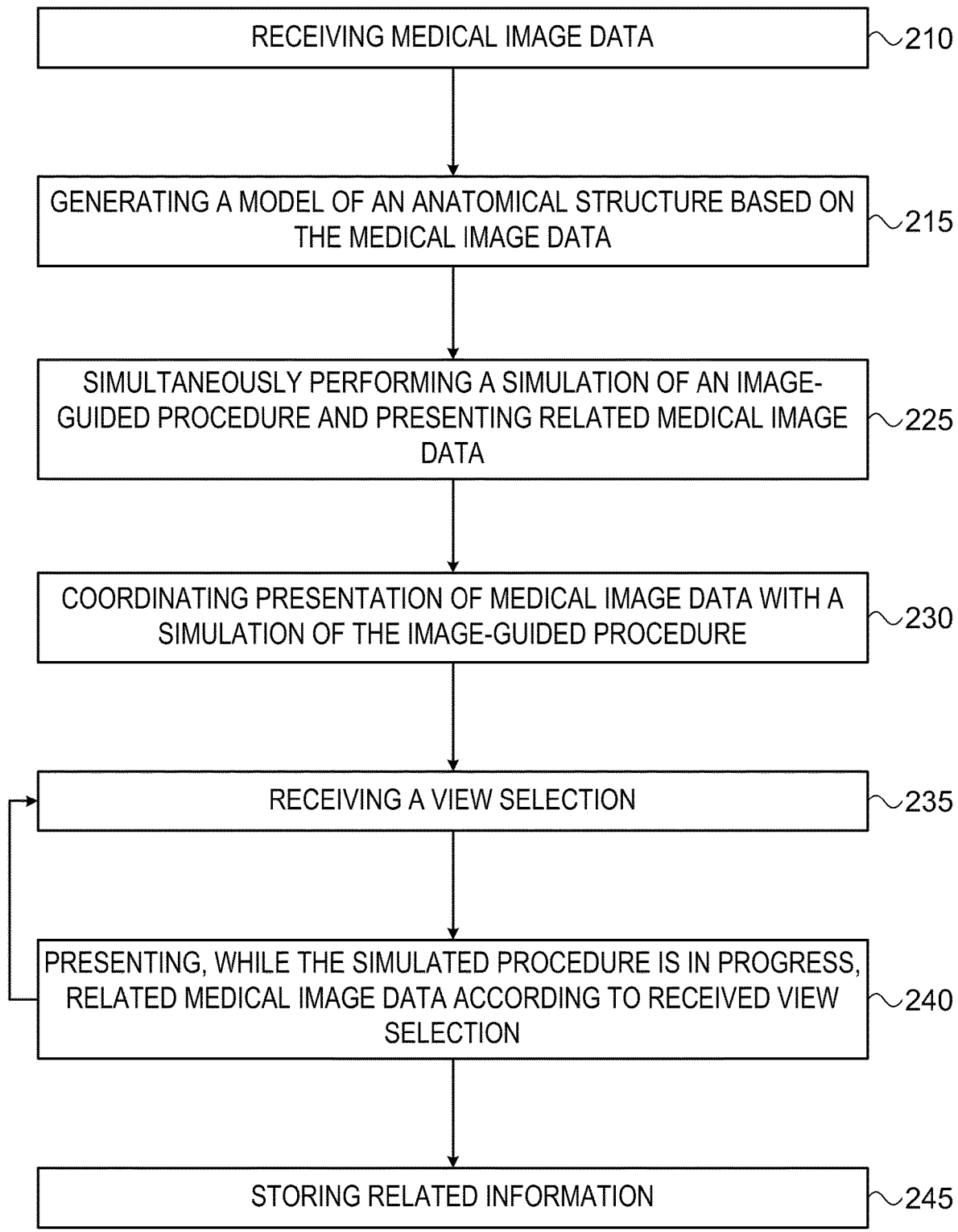
FIG. 2 is a flowchart diagram illustrating a method for concurrently simulating an image-guided procedure and presenting medical image data according to some embodiments of the present invention.

Reference is made to FIG. 2, which shows an exemplary flowchart describing a method for simulating an image-guided procedure according to some embodiments of the invention. The method may include receiving patient-specific medical image data that may be related to a specific subject or patient about to be treated (box 210). The medical image data may be received directly from an imaging or scanning system such as for example, a CT or MRI scanner or alternatively from an external image data repository, such as a picture archiving communication system (PACS). As will be understood to a person skilled in the art, the medical image data may be received from any other applicable source.

According to some embodiments, the received medical data may be stored locally or internally within a data repository, such as data repository 140. According to some embodiments, possibly based on received data, data may be generated. For example, based on a set of three hundred (300) CT images, an extended set of six hundred (600) may be generated. For example, by examining an initial set of images, embodiments of the invention, e.g., executable code executed by controller 131, may generate or produce additional images and thus produce a new set of images. For example, if a given set of images was produced by acquiring a single image per a movement of one centimeter (1 cm) of the imaging unit, a new set may be produced by artificially generating images to reflect a movement of half a centimeter (½ cm) of the imaging unit. For example, based on two sequential images in an original set, an additional image may be artificially generated, e.g., by observing variations between the two original images. Such artificially generated image may be inserted between the two original images in order to produce a new set of images that may be coherent and may adequately represent the anatomy or other aspects of a related patient. Such generation of images may enable embodiments of the invention to provide better resolution, and enhance a correlation of medical data and a simulated procedure as described herein. A set of images, either as received or extended as described herein may be stored locally, e.g., in data repository 140.

As described herein, raw medical image data, e.g., acquired by, and received from an imaging system may be processed. Processing of medical image data may be performed prior to generating views or image based models as described herein. For example, pixels for rendering may be produced by interpolation applied to acquired pixels or other image related data. For example, CT slices may be artificially generated by interpolation of acquired CT slices. Windowing transformations as known in the art may be another example of processing that may be applied to medical image data by embodiments of the invention, e.g., in order to enhance, alter or otherwise modify aspects such as contrast or brightness of an image that may be received from an imaging system or may be artificially generated as described herein.

As shown by box 215, the method may include generating a model of an anatomical structure based on medical image data. Generation of an anatomical structure may be based on examining and/or processing of medical data, e.g., as received as shown by box 210 and/or generated as described herein. In cases where the imaging data is patient specific, e.g., is produced by imaging or scanning a real specific patient or is extended based on specific patient image data, the anatomical model may be patient specific too, namely, the model generated as described herein may represent a specific, real patient. Model generation may be according to methods or other aspects as described in US Patent Application Publication US 2009/0177454.

As shown by box 225, the method may include simultaneously performing a simulation of an image-guided procedure (that may be based on the generated anatomical model) and presenting related medical image data. For example, while the simulated procedure is in progress, related medical image data may be displayed as described herein. In cases where the medical image data used for generating a model as described herein is patient specific, the model generated as described herein may also be patient specific and, accordingly, a simulation of a procedure as described herein may be patient specific, namely, reflect, simulate or be otherwise related to a real procedure performed on a real, specific patient. According to embodiments of the invention, a simulated procedure may comprise a graphical representation of an anatomical model that may be displayed on a monitor with additional information, such as simulated models of tools. In some embodiments, the graphical representation of the anatomical structure or organ and of the tools may exhibit real anatomical or physical qualities, traits, features, nature or aspects, e.g., move, bend, contract, react to pressure or medicine, bleed etc. A simulation of an image-guided procedure may comprise an image or graphical representation of an anatomical organ, e.g., a model as described herein, that may be rotated or otherwise positioned, or may be made to imitate a real anatomical system, e.g., change or evolve with time, change shape in response to an operation of, or an interaction with a medical tool or substance, bleed, or otherwise present or display real anatomical organ's behavior and related tools, medicine or other aspects. For example, a catheter, stent or other tools, devices or elements may all be shown and further simulated. Accordingly, a physician may perform a computerized simulation of the image-guided procedure (as shown by box 225) as a pre-procedure of the actual surgery (e.g., a surgical rehearsal or surgical simulation), part of a planning procedure, as a training session or as a post-procedure.

As shown by box 225, the flow may include presenting related medical image data. According to embodiments of the invention, presentation of related medical image data may be performed simultaneously or concurrently with performance of a related simulation of an image-guided procedure, or it may be otherwise at the same time. In some embodiments, presentation of medical image data may be synchronized or otherwise coordinated with a progress, state, mode, context or any relevant aspect of a simulated procedure. For example, in cases where the medical image data is related to a specific patient and, accordingly, the model and simulation described herein may be patient specific as well, patient specific medical image data, e.g., medical image data obtained from the specific patient by an imaging system, may be presented together with the simulated procedure, e.g., while the simulated procedure is in progress. For example, a single display may be used to present medical image data and a simulated procedure at the same time, e.g., as shown in FIG. 3.

Figure 3:
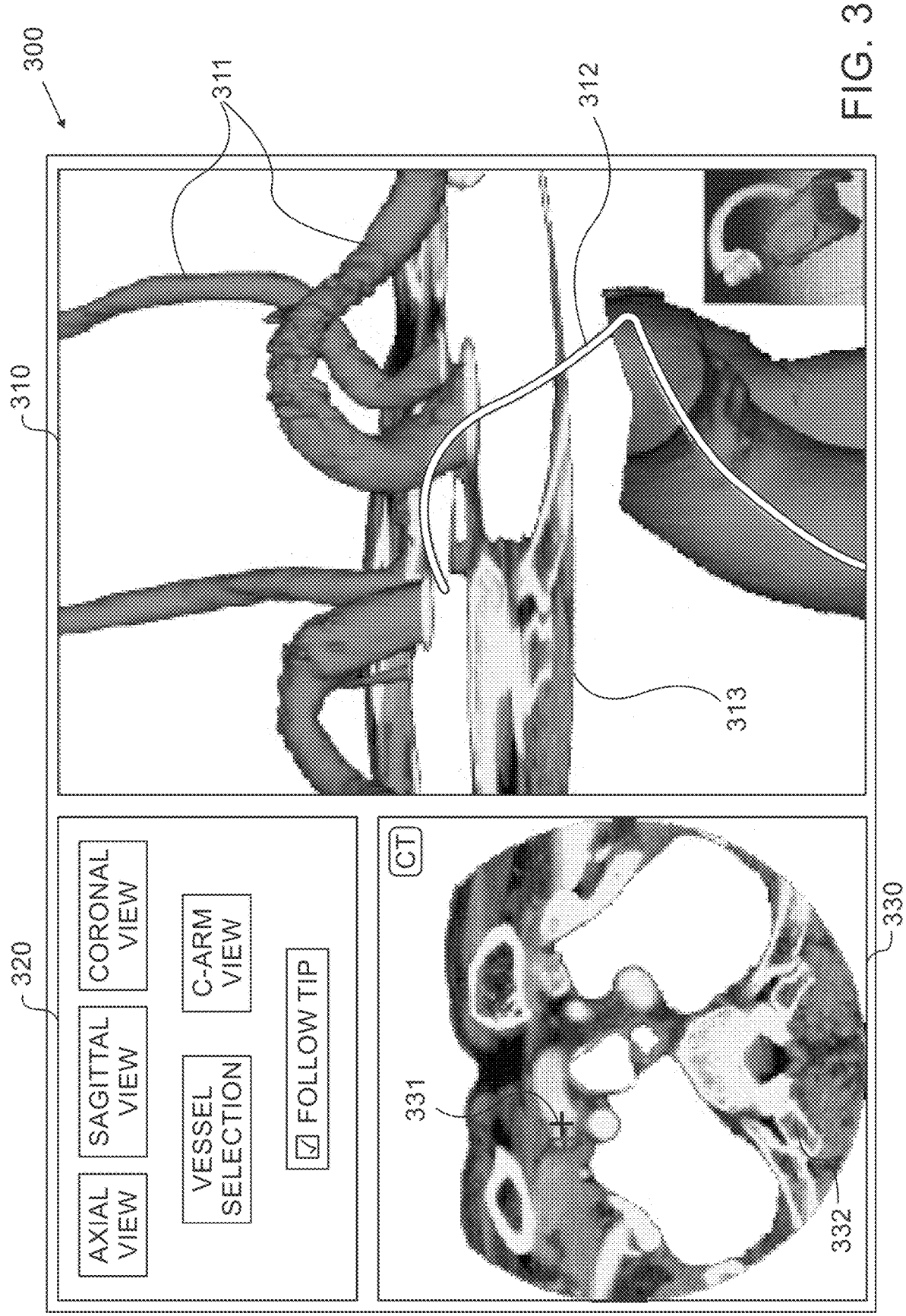
FIGS. 3, 4, 5 and 6 show exemplary screenshots related to an integrated presentation of a simulated procedure and medical image data according to embodiments of the invention.

Reference is additionally made to FIG. 3 showing an exemplary screenshot 300 related to an integrated presentation of a simulated medical procedure and an exemplary CT image data according to embodiments of the invention. CT data is typically generated and stored as a stack of images, which may be referred to as slices forming together a three-dimensional (3D) box or volume of a scanned area. This volume may be rendered as a whole using volume rendering techniques or alternatively a two-dimensional (2D) slice, also referred herein as a CT slice, may be sampled and displayed. For the sake of simplicity and clarity, reference herein will mostly be made to CT images or slices as known in the art, however, it will be recognized that any medical image data, e.g., MRI, X-Ray, ultrasound or any suitable imaging or other data may just as well be used and accordingly, embodiments of the invention are not limited by the type, source or nature of the medical data.

As shown by FIG. 3, a display may be divided into a number of regions, for example, three regions 310, 320 and 330. A first region 310 may be related to the simulated procedure and may accordingly present a patient-specific digital image-based model of an anatomical structure. In this exemplary display, the image-based model represents a vessel. Region 310 may further display a simulated or virtual medical tool model representing a physical intervention medical tool manipulated by a user during a simulated procedure. For example, a catheter 312 may be shown with relation to blood vessels 311. A simulated procedure may comprise showing a movement of the catheter, e.g., as a result of actions taken by a physician, as well as reaction or other behavioral or other aspects of the anatomical organs and tools. For example, as the simulation progresses, catheter 312 may be shown to move through blood vessels 311, and blood vessels 311 may be shown to move, bend or otherwise react or exhibit phenomena typically seen or exhibited by real living organs.

As shown by 330 in FIG. 3, a second region or area may be dedicated or related to presenting related medical image data. For example and as shown by 332, a CT slice image may be shown. As described herein, various information, presentation modes and other features may be enabled with respect to the presentation of medical image data. For example, various elements shown in a simulation region 310 may be respectively shown, marked, highlighted, referenced or indicated in a medical image data region 330. Such correlation of views may be highly appreciated by a person having ordinary skill in the art. For example and as shown by 331, a location of a simulated tool or part of a simulated tool that may be shown in the simulation region 310 may be marked, highlighted, shown, referenced or indicated with respect to the medical image data. For example, the "+" indication shown by 331 may represent the location of the tip of catheter 312 with respect to CT slice image 332 shown in region 330. Accordingly, a physician may be able to verify or determine the location of the tip of the catheter or otherwise orient himself by observing both the simulation region 310 and the medical image data region 330.

In other embodiments, other aspects, details, parameters or relevant information may be indicated, shown, highlighted or referenced with respect to the medical image data. For example, a specific blood vessel may be shown or highlighted in the medical image data by a predefined color thus enabling a user to easily determine the location of the blood vessel with respect to the medical image data. Such blood vessel may be similarly shown in the model thus enabling a user to correlate the view provided by the image-based model and the view provided by the medical image data. For example, a specific tissue, a specific organ or a specific region that may be shown by the model may be highlighted, shown, referenced or otherwise indicated in or with reference to the medical image data.

As physicians and other medical personnel may be used to examining information by observing images such as CT images, integration of CT, MRI, X-Ray or other modalities with a simulated procedure as described herein may have obvious benefits and may be highly appreciated by a person having ordinary skill in the art.

Correlation, synchronization, coordination and/or integration of a simulated model and/or procedure with a presentation or related medical image data as described herein may be implemented and/or performed according to any applicable design or configuration. For example and as shown by FIG. 1, presentation unit 125 may interact with simulation unit 115 in order to obtain any relevant information or parameters related to a state, context, progress or other aspect of a simulation. Presentation unit 125 may further interact with data repository 140 (or any other applicable data repository) in order to obtain medical image data. Accordingly, possessing any relevant information related to the simulation and medical image data, presentation unit 125 may coordinate, synchronize or otherwise relate a presentation of medical image data with the simulated procedure. For example, as the simulated model used for a simulated procedure may be generated based on medical image data, the simulated model may include references to related medical image data. As known in the art, cross references related to a number of objects, structures or elements may be used in order to relate elements to one another. For example, a specific region or volume of a simulated model may be based on specific CT frames or slices. Accordingly, cross references related to elements in a simulated model and image medical data elements may be maintained and used in order to correlate, coordinate, synchronize or otherwise relate a presentation of a simulated model and/or procedure with the relevant medical data. For example, presentation unit 125 may receive or obtain a reference to a medical image data element (e.g., a specific CT image) from simulation unit 115 or model generation unit 110 and may use such reference to retrieve the relevant CT image from data repository 140 and further display such CT image as shown by 332.

As shown by 313, a medical image data element (e.g., a CT slice image) may be superimposed or overlaid on (or with) a presentation of a simulated model or alternatively, a simulated model may be superimposed on, or otherwise combined with, medical image data. Any presentation combining an integrated presentation of medical image data elements such as CT slice images and a simulated model as described herein may be generated. For example and as shown by 313, a CT image slice may be displayed in the simulation region 310. A medical image data element presented in a simulation region as shown may be the same element displayed in the dedicated medical image data region. For example, the CT slice image shown by 332 may be the same CT slice image shown by 313. Such display mode may further help a physician in the process by providing an additional orientation aspect or tool as may readily be appreciated by a person having ordinary skill in the art. As shown, a medical image data element may be positioned or oriented in the simulation region according to a specific view angle or other view attributes or aspects. For example and as shown by 313 and 332, an axial slice view as known in the art may be presented. Other views may be enabled by embodiments of the invention, for example, based or according to user selection as described herein with respect to region 320. As shown, a medical image data shown in conjunction with the simulated model may enable a user to better interpret shown information, for example, a user may quickly and easily determine the angle related to the medical image, a location of anatomical parts and tools etc.

As shown by 320, a third region may comprise user interface elements, e.g., graphical user interface (GUI) objects, that may enable a user to control various aspects of a simulated procedure and display of medical data as described herein. For example, a view of medical image data presented in region 330 may be selected. For example and as shown, an axial view (e.g., as shown by CT slice 332 in region 330), a sagittal view, a coronal view, a C-Arm view or a vessel selection view may be selected. Exemplary view selections or modes as shown in FIG. 3 are not to be construed as limiting embodiments of the invention, any other applicable view selections, modes or angles may be possible according to embodiments of the invention. Likewise, exemplary distribution of graphic elements and/or regions as shown by FIG. 3 are presented as an example and may be different in different embodiments, for example, a number of monitors or display screens may be used in order to display information as described herein or any other arrangement of regions or graphical elements may be possible.

Referring back to FIG. 2 and as shown by box 230, the flow may include coordinating presentation of medical image data with a simulation of the image-guided procedure.

According to embodiments of the invention, various presentation modes may be selected. For example, presentation of a set of medical data images may be automatic, e.g., according to various constraints, conditions, event or other aspects related to a simulated procedure. In some embodiments of the invention, medical image data may be automatically selected, presented, replaced or otherwise manipulated, e.g., based on a progress, state and/or context of a related to a simulated procedure. For example and as shown in region 320, a checkbox may enable a user to select a mode of presenting medical image data according to a location of a tool or part of a tool. For example, checking the "follow tip" checkbox shown in region 320 may cause embodiments of the invention to update a presentation of medical image data based on the location of a tip of a simulated catheter, e.g., the tip of catheter 312. For example, a CT slice may be selected and presented based on the location of the tip of catheter 312 with respect to the blood vessels 311 shown in region 310. Accordingly, presentation of medical image data may be according to a progress of a simulated procedure.

Alternatively or additionally, medical image data may be presented based on a selection of a location or region in the simulated model. For example, upon detecting a selection, e.g., a click of a mouse on a specific location or element of a simulated model, the relevant medical image data may be displayed, e.g., in the dedicated region or area. Accordingly, a physician may be presented with a CT, MRI, X-Ray or other modality's data with respect to a simulated model. Such presentation may be performed during a progress of a simulated procedure or in offline mode. For example, the physician may pause, stop or terminate a simulated procedure, examine the simulated model (that may be static or frozen), and further select to review CT or MRI images (that may be real, actual images taken from a specific patient as described herein) related to a specific location in the model, e.g., by clicking a location of interest on the model. Presenting medical image data based on a selection of a location on a simulated model may be accomplished by utilizing cross references as described herein.

As shown by box 235, the flow may include receiving a view selection. For example, a user may select one of the view selections shown in region 320 in FIG. 3. As shown by box 240, the flow may include presenting, while the simulated procedure is in progress, related medical image data according to received view selection. For example, one of three orthogonal views as known in the art, axial (as shown by FIG. 3), coronal and sagittal may be selected. For example, a user may select the sagittal view by pressing the appropriate button shown in region 320 and be provided with a presentation of a simulation and medical image data according to a sagittal view as shown in FIG. 4.

Figure 4:
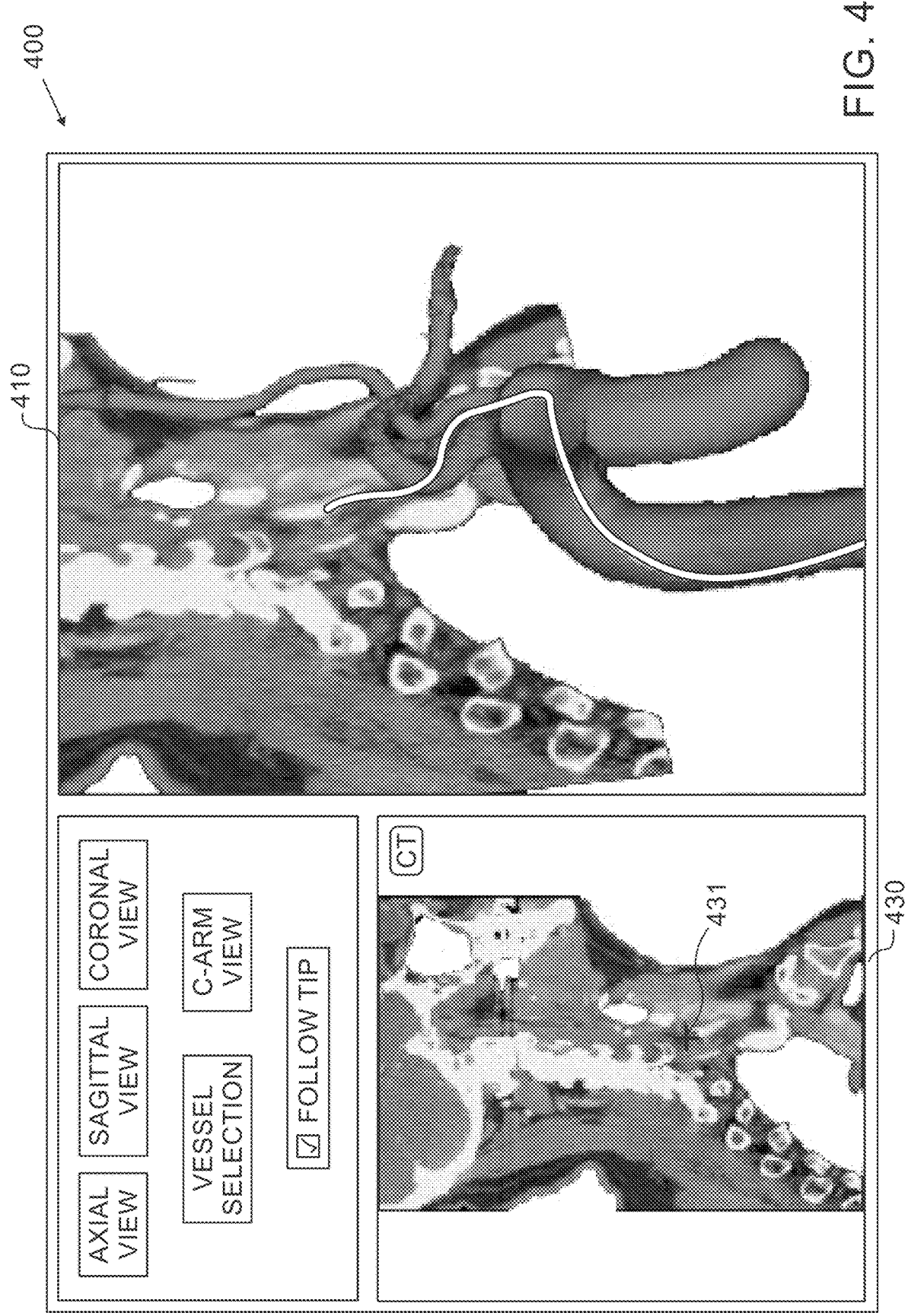

Reference is additionally made to FIG. 4 showing an exemplary screenshot 400 related to an integrated presentation of a simulated procedure and medical image data according to embodiments of the invention. As shown by regions 410 and 430 in FIG. 4, a sagittal view as known in the art may be provided, e.g., upon selection of such view as described herein. As known in the art, a sagittal or other view may be selected in order to better determine aspects of anatomical elements or otherwise enable a better or more suitable view, e.g., when other views do not fully reveal, disclose or expose areas a physician may be interested in. Accordingly, when applicable, a physician or user of a system implementing embodiments of the invention may select a sagittal view and may be provided with a presentation as shown in FIG. 4. Any relevant embodiments, features or aspects described herein, e.g., integration of medical image data with a simulated procedure, automatic selection, replacement or presentation of CT or other image slices, automatic presentation of medical image data according to a progress of a simulation or superimposing of medical image data on a simulated model may be applicable to any of the views described herein, e.g., with reference to FIGS. 4, 5, 6, 7 and 8. For example, and as shown by 431, a location of a tool may be indicated with respect to the medical image data, e.g., similarly to information indicated as described with reference to 331 in FIG. 3.

Figure 5:
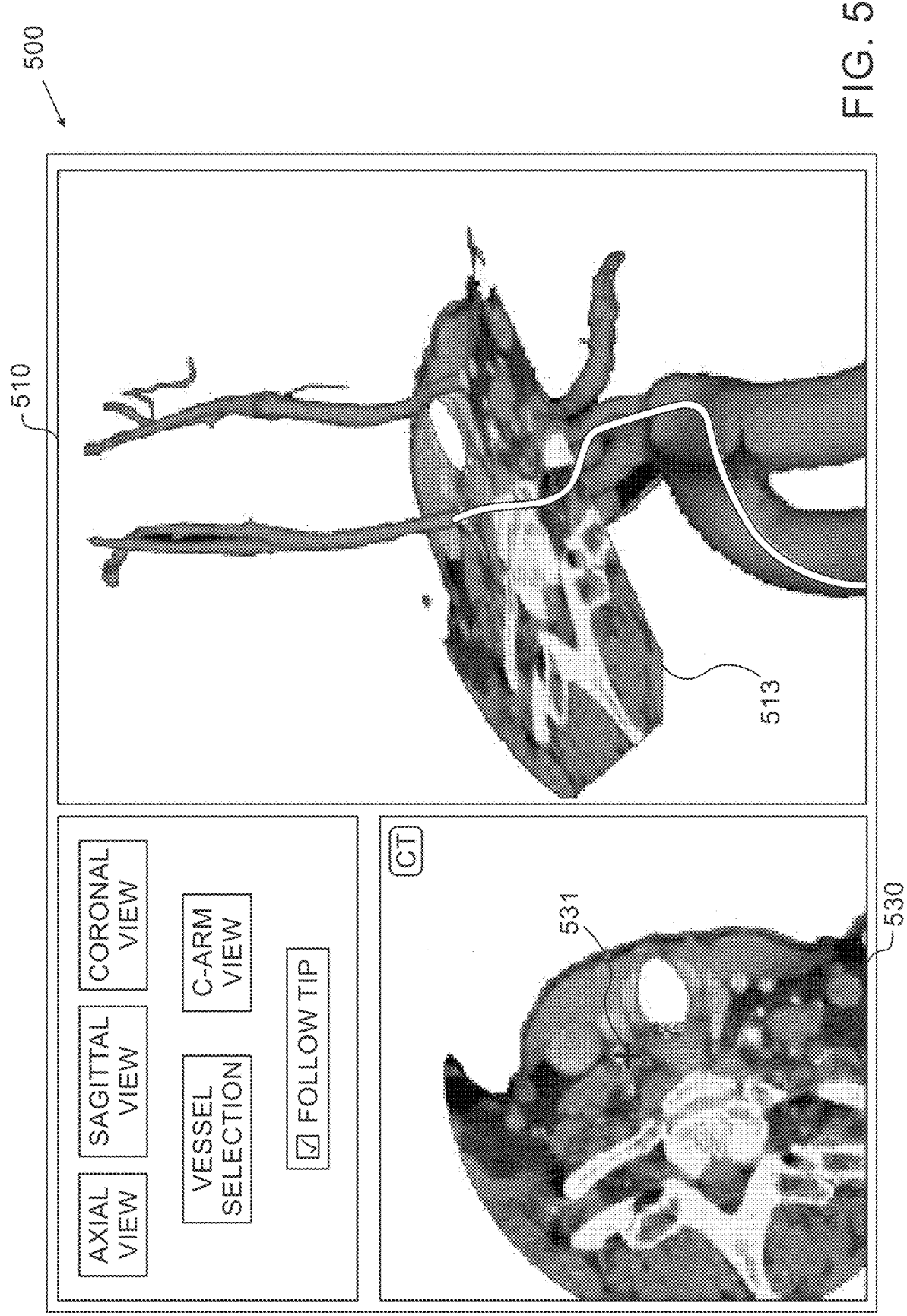

According to embodiments of the invention, in addition to the orthogonal views described herein, non-orthogonal views may be enabled and/or presented. Reference is additionally made to FIG. 5 showing an exemplary screenshot 500 related to an integrated presentation of a simulated procedure and medical image data according to embodiments of the invention. As shown by FIG. 5, a vessel section view may be provided, e.g., upon selection of such view by a user as described herein. According to embodiments of the invention, a user may select a vessel section view, for example, in order to "zoom in" on a specific vessel. In some embodiments, a relevant CT slice may be displayed along non-orthogonal ('oblique') sections as shown by 513. As shown, a CT slice placed according to a plane perpendicular to a vessel of interest may be displayed in region 530 and may further be shown or represented in region 510 as shown by 513. Such CT slice may typically be positioned so that the vessel of interest is displayed as a circle in the center of region 530. Those having ordinary skill in the art may readily appreciate the benefit of a vessel section view combined with a simulation as described herein, such integrated view may enable a physician to easily examine a position of a tool within an organ, e.g., a position of a catheter guided through a blood vessel. For example, such view may prove highly desirable in helping a physician navigate a catheter that may be blocked by obstacles within a blood vessel.

Any element of interest may be automatically located at a predefined location in regions 630, 530, 430 and/or 330. For example, a medical image data, e.g., CT, may be shown such that a medical tool related to the simulated model or the simulation is shown in a predefined location, e.g., in the center of region 330. Alternatively or additionally, a selected anatomical organ may be displayed in a predefined location. For example, a CT slice image may be positioned in regions 330, 430, 530 or 630 such that a selected blood vessel is shown in the center of these regions.

Figure 6:
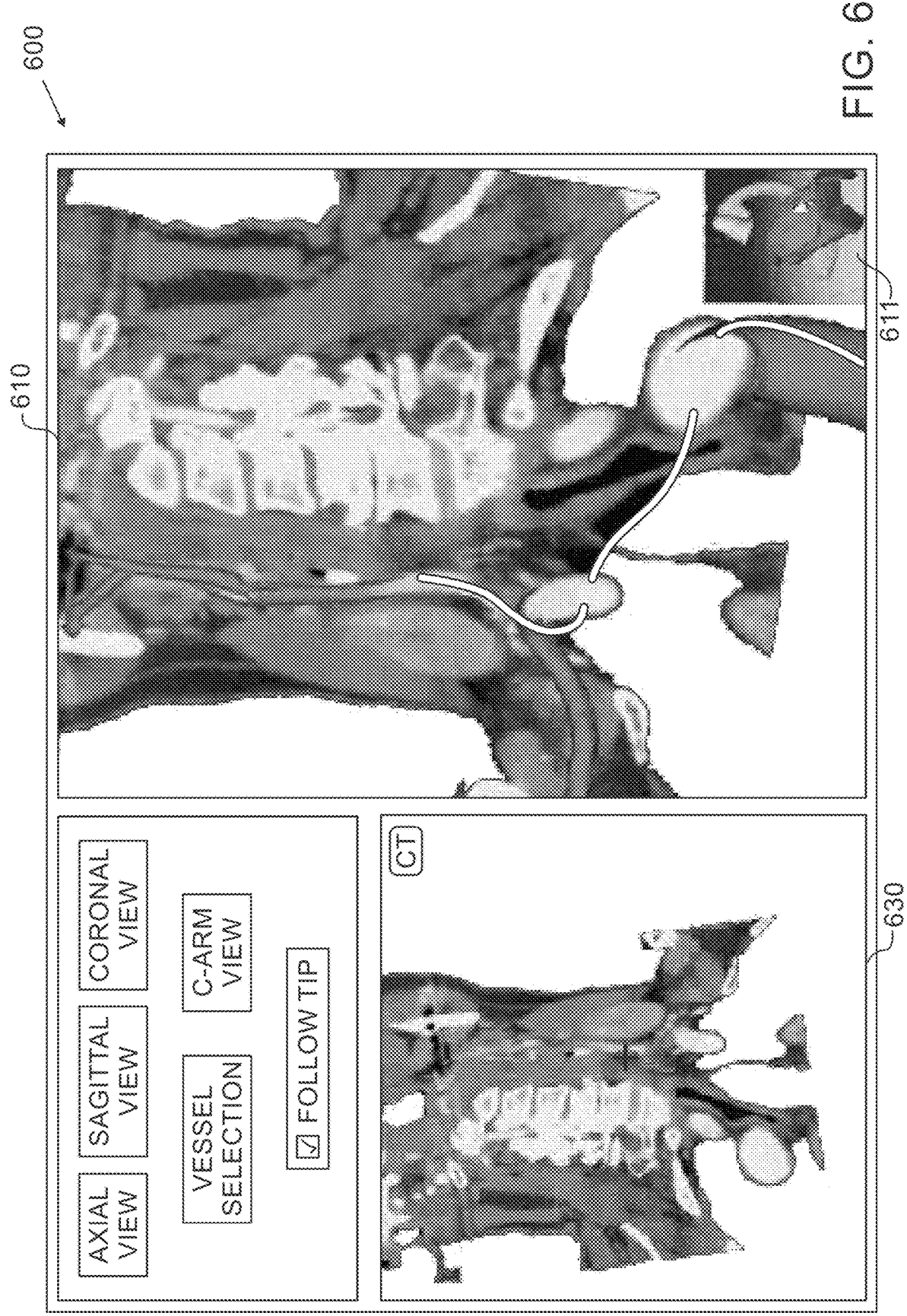

Another possible view that may be selected and provided according to embodiments of the invention may be a C-Arm view. As an arm typically used for positioning an X-Ray camera is typically in the shape of the "C" letter, the name C-Arm view may be appropriate for referring to a view as available to an X-Ray camera. According to embodiments of the invention, upon selection of such view, a user may be provided with a point of view of an X-Ray camera, namely, the user is provided with a view of the anatomical region as seen from the position of a related X-Ray camera or another imaging device placed at such position. Such view may be well appreciated by physicians who are used to examining X-Ray output or images. Reference is additionally made to FIG. 6 showing an exemplary screenshot 600 related to an integrated presentation of a simulated procedure and medical image data according to embodiments of the invention. As shown by 611, a position of an imaging device (that may typically be an X-Ray camera) may be shown, thus enabling a physician to relate displayed information to the position of the imaging device at the time the image was acquired. As described herein, region 630 in FIG. 6 may, similarly to regions 330, 430 and 530, present simulated X-Ray images. Region 610 in FIG. 6 may present a simulated model, e.g., similarly to regions 310, 410 and 510. As described herein, the medical image data shown in region 610 in FIG. 6 may be superimposed on the simulated model in region 610 of FIG. 6 such that a user may easily realize the relation of the medical image data with the simulated model.

Figure 7:
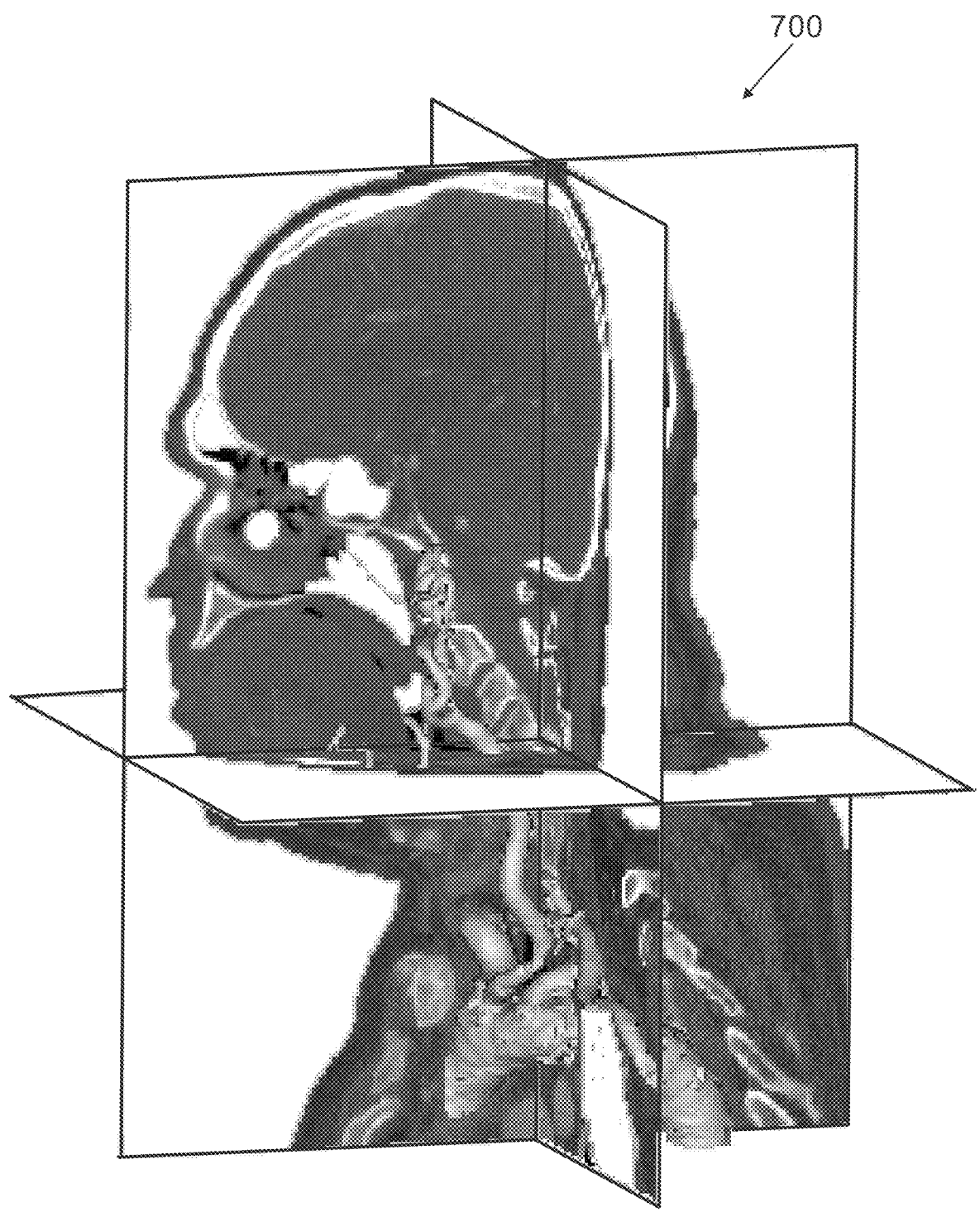
FIGS. 7 and 8 show exemplary rendering modes that may be used for presentation of medical image data according to embodiments of the invention.

Reference is additionally made to FIG. 7 showing an exemplary rendering mode 700 according to embodiments of the invention. According to embodiments of the invention and as shown in FIG. 7, a combined rendering of Axial, Sagittal and Coronal slices (over a 3D anatomy model) may be performed and displayed. For example, instead or in addition to presenting a 2D slice in region 330 as shown in FIGS. 3 through 6, any number of different slices can be jointly displayed over a single model as shown by FIG. 7. Such view may be desirable in various cases, e.g., when a volume view is required or helpful. Such combined slices view may be displayed in one of regions 330, 430, 530 and/or 630 instead of or in addition to a 2D view, e.g., a CT slice image as described herein. Yet another view that may be presented is shown in FIG. 8.

According to embodiments of the invention, volume rendering of medical image data may be used to produce a three dimensional view of the medical image data. Various rendering modes may be enabled and/or combined with view selections described herein. For example, combined slices rendering or volume rendering may be performed upon selection of a user and may further be implemented in conjunction with selected views such as those described herein.

Figure 8:
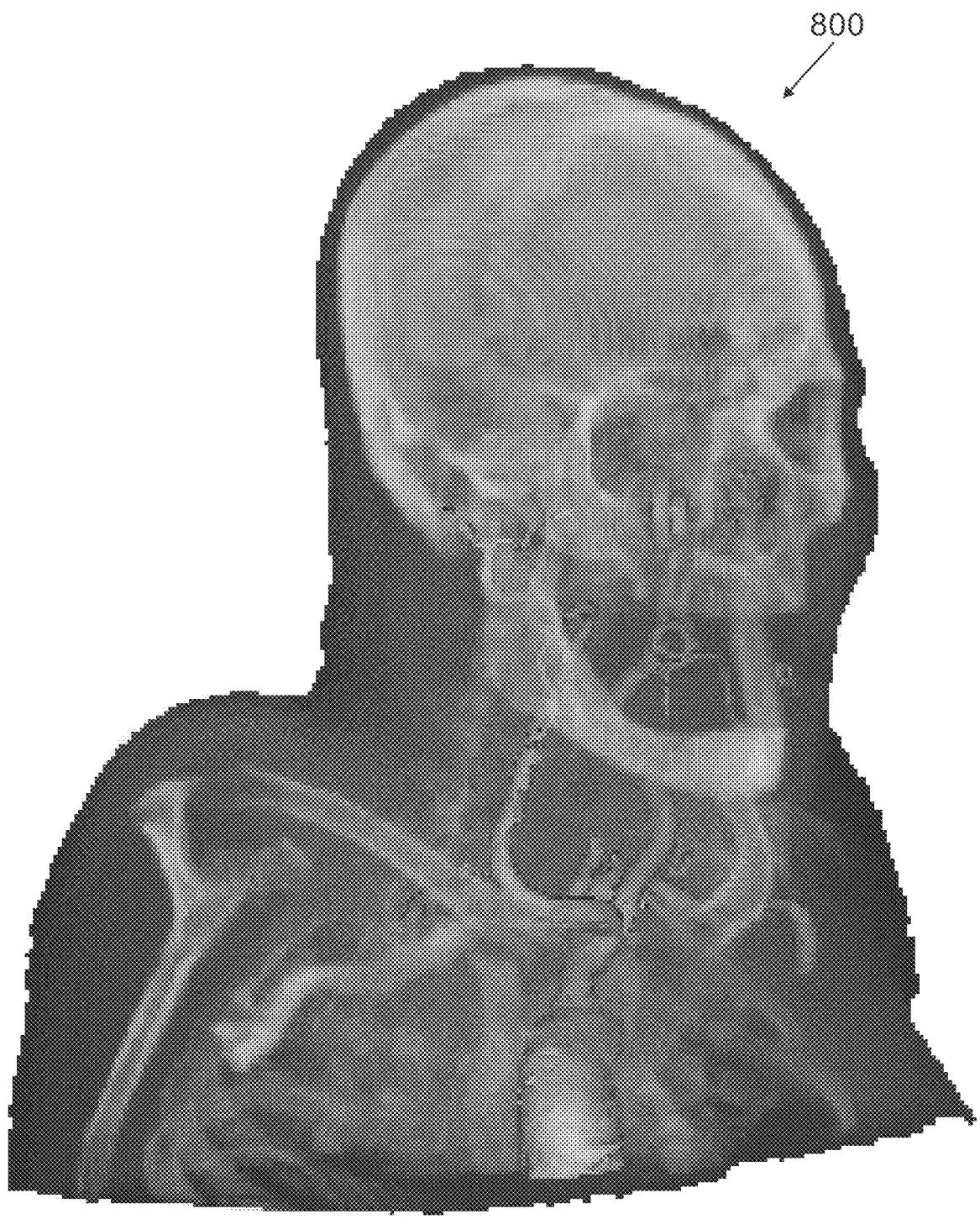

Reference is additionally made to FIG. 8 showing an exemplary rendering mode 800 according to embodiments of the invention. As shown in FIG. 8, medical image data may be presented via or using volume rendering. Using volume rendering, images or other graphical information may be displayed, for example, in region 330 of FIGS. 3 through 6 and may be helpful when volume or depth aspects of an anatomical object or organ need to be evaluated or examined. A volume rendered image as shown in FIG. 8 may typically be associated with a transparency parameter and/or setting such that its transparency may be controlled in order to enable viewing parts or sections that may otherwise be hidden, e.g., by parts or regions containing or otherwise concealing them. Accordingly, variable transparency may be enabled. Referring back to FIG. 2, as shown by box 245, the flow may include storing related information. For example, a simulated procedure, including any view selection or movement of tools may be recorded and such recording may be stored and later used, e.g., in a training session.

Embodiments of the invention may include an article such as a computer or processor readable medium, or a computer or processor storage medium, such as for example a memory, a disk drive, or a USB flash memory, encoding, including or storing instructions, e.g., computer-executable instructions, which when executed by a processor or controller, carry out methods disclosed herein.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like.

Unless explicitly stated, the method embodiments described herein are not constrained to a particular order or sequence. Additionally, some of the described method embodiments or elements thereof can occur or be performed at the same point in time or overlapping points in time. As known in the art, an execution of an executable code segment such as a function, task, sub-task or program may be referred to as execution of the function, program or other component.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method of performing computerized simulations of image-guided procedures, the method comprising:
   receiving medical image data related to a specific patient;
   producing a three-dimensional (3D) patient-specific digital image-based model of an anatomical structure of the specific patient based on the medical image data;
   performing a computerized simulation of an image-guided procedure using the 3D image based model; and
   during the simulation, simultaneously:
      displaying, in a first display region, the 3D image-based model,
      displaying, in a second display region, at least some of the medical image data as a first two dimensional (2D) slice in a first 2D view, and
      displaying, in the first display region, the at least some of the medical image data as a second 2D slice in a second 2D view, combined with the 3D image-based model such that the 2D view intersects the 3D image-based model in a single plane perpendicular or oblique to the anatomical structure.

2. The method of claim 1, wherein the medical image data and the image-based model form an integrated display.

3. The method of claim 1, wherein the anatomical structure is a vessel and the medical image data is displayed in a plane perpendicular to the vessel.

4. The method of claim 3, wherein the 2D view is integrated with the image-based model such that the plane is positioned at a location corresponding to a location of a simulated medical tool.

5. The method of claim 1, wherein the simulation comprises a simulated model of a physical medical tool and the simulation comprises manipulating the simulated model of the medical tool.

6. The method of claim 5 wherein displaying comprises displaying on a specific location within a representation of the medical image data an indication representing the simulated medical tool, the specific location corresponding to a location of at least a part of the simulated model of the medical tool in relation to the image-based model.

7. The method of claim 5 comprising:
synchronizing a display of the medical image data with movement of the simulated model of the medical tool.

8. The method of claim 5 wherein the 2D view comprises a medical image and the method further comprises automatically replacing a first medical image, related to a first location in the image-based model with a second medical image related to a second location in the image-based model when the simulated model of the medical tool moves from the first location to the second location.

9. The method of claim 1, wherein the medical image data is received from a picture archiving and communication systems (PACS) archive.

10. The method of claim 1, wherein the medical image data is received from one of: a computerized tomography (CT) system, a magnetic resonance imaging (MRI) system, a X-Ray system, a positron emission tomography (PET) system, an Ultrasound system and a fluoroscopy system.

11. The method of claim 1, comprising generating artificial medical image data based on received raw medical image data and simultaneously presenting the image-based model and at least some of the artificial medical image data.

12. The method of claim 1, wherein said 2D view comprises an image related to a specific plane and said displaying comprises displaying the image to provide a specific plane view.

13. The method of claim 12, wherein said displaying comprises producing an integrated display of said image-based model and said specific plane view.

14. The method of claim 1, wherein said plane is one of: an axial plane, a coronal plane, a sagittal plane, a plane orthogonal to a selected vessel, a non-planar surface and a plane related to an imaging system used to acquire said medical image data.

15. The method of claim 12, wherein said image is rendered to provide a specific surface view using maximum intensity projection (MIP).

16. The method of claim 1, wherein displaying the medical image data comprises a volume rendering of said medical image data to produce a three dimensional (3D) view of said medical image data.

17. The method of claim 1, wherein displaying the medical image data comprises least one of: highlighting, marking, showing, referencing and indicating at least one of: a tissue, an organ and a region.

18. The method of claim 1, comprising receiving raw medical image data from a system having a first view, wherein the 2D view is generated from the received raw medical image data to produce a second view different from the first view.

19. The method of claim 18, wherein the raw medial image data is from a CT system and the medical image data displayed is an X-Ray image.

20. The method of claim 1 wherein the 2D view comprises a medical image and wherein the displaying further comprises additionally displaying the same medical image in a region of a display separate from a simulation region in which the medical image is combined with the 3D image based model.

21. An article comprising a non-transitory computer-storage medium having stored thereon instructions that, when executed by a processing platform, result in:
receiving medical image data of a specific patient;
producing a three-dimensional (3D) patient-specific digital image-based model of an anatomical structure of the specific patient based on the medical image data;
performing a computerized simulation of an image-guided procedure using the 3D image based model; and
during the simulation, simultaneously:
displaying, in a first display region, the 3D image-based model,
displaying, in a second display region, at least some of the medical image data as a first two dimensional (2D) slice in a first 2D view, and
displaying, in the first display region, the at least some of the medical image data as a second 2D slice in a second 2D view, combined with the 3D image-based model such that the 2D view intersects the 3D image-based model in a single plane perpendicular or oblique to the anatomical structure.

22. The article of claim 21, wherein the displaying further results in the medical image data and the image-based model forming an integrated display.

23. The article of claim 21, wherein the anatomical structure is a vessel and the medical image data is displayed in a plane perpendicular to the vessel.

24. The article of claim 21, wherein the simulation comprises a simulated model of a physical medical tool and the simulation comprises manipulating the medical tool.

25. The article of claim 24, wherein the 2D view is integrated with the image-based model such that the plane is positioned at a location corresponding to a location of the simulated medical tool.

26. The article of claim 24, wherein displaying comprises displaying on a specific location within a representation of the medical image data an indication representing the simulated medical tool, the specific location corresponding to a location of at least a part of the simulated model of the medical tool in relation to the image-based model.

27. The article of claim 24, wherein the instructions when executed result in synchronizing a display of the medical image data with movement of the simulated model of the medical tool.

28. The article of claim 21, wherein the medical image data is received form a picture archiving and communication systems (PACS) archive.

29. The article of claim 21, wherein the medical image data is received from one of: a computerized tomography (CT) system, a magnetic resonance imaging (MRI) system, a X-Ray system, a positron emission tomography (PET) system, an Ultrasound system and a fluoroscopy system.

30. The article of claim 21, wherein the instructions when executed result in generating artificial medical image data based on received raw medical image data and simultaneously presenting the image-based model and at least some of the artificial medical image data.

31. The article of claim 21, wherein the instructions when executed result in generating, based on the received raw medical image data, an image related to a specific plane and displaying the image to provide a specific plane view.

32. The article of claim 31, wherein the instructions when executed further result in producing an integrated display of said image-based model and said specific plane view.

33. The article of claim 31, wherein said specific plane is related to a plane and wherein said plane is one of: an axial plane, a coronal plane, a sagittal plane, a plane orthogonal to a selected vessel, a non-planar surface and a plane related to an imaging system used to acquire said medical image data.

34. The article of claim 21, wherein the said image is rendered to provide a specific surface view using maximum intensity projection (MIP).

35. The article of claim 21, wherein displaying the medical image data comprises a volume rendering of said medical image data to produce a three dimensional (3D) view of said medical image data.

36. The article of claim 21, wherein displaying the medical image data comprises at least one of: highlighting, marking, showing, referencing and indicating at least one of: a tissue, an organ and a region.

37. A system for performing computerized simulations of image-guided procedures, the system comprising:
 an imaging unit to generate medical image data of a patient;
 a model generation unit to:
  receive the medical image data and to produce a three-dimensional (3D) patient-specific digital image-based model of an anatomical structure of the specific patient based on the medical image data; and
  produce a simulated model of a physical medical tool;
 a simulation unit to perform a computerized simulation of an image-guided procedure using the 3D image based model comprising manipulating the physical medical tool; and
 a presentation unit to cause a simultaneous display during the simulation of the digital image-based model, wherein the simultaneous display comprises:
  displaying, in a first display region, the 3D image-based model,
  displaying, in a second display region, at least some of the medical image data as a first two dimensional (2D) slice in a first 2D view,
  displaying, in the first display region, the simulated model of the medical tool and at least part of the medical image data as a second 2D slice in a second 2D view combined, with the 3D image-based model such that the 2D view intersects the 3D image-based model in a single plane perpendicular or oblique to the anatomical structure, and
 automatically replacing a first medical image, related to a first location in the image-based model with a second medical image related to a second location in the image-based model when the simulated model of the medical tool moves from the first location to the second location, wherein the first and second medical images are related to the medical image data related to the specific patient.

* * * * *